3,756,917
FERMENTATION PROCESS FOR THE PRODUCTION OF ERYTHRITOL
John R. Dezeeuw, Stonington, and Edward J. Tynan III, Gales Ferry, Conn., assignors to Pfizer Inc., New York, N.Y.
No Drawing. Filed Nov. 12, 1971, Ser. No. 198,451
Int. Cl. C12d 13/02
U.S. Cl. 195—28 R    3 Claims

ABSTRACT OF THE DISCLOSURE

A process for producing erythritol by aerobically fermenting an aqueous hydrocarbon-containing nutrient medium with a new strain of the yeast, Candida lipolytica.

BACKGROUND OF THE INVENTION

This invention relates to a process for the production of erythritol by fermentation. In particular, it relates to a process for the production of erythritol by aerobically fermenting an aqueous hydrocarbon-containing nutrient medium with a new strain of the yeast, Candida lipolytica, and isolating the erythritol by direct crystallization from concentrated clarified fermentation broth.

Erythritol is a white crystalline polyhydric alcohol which has a pleasantly sweet taste, being about 60% as sweet as sucrose. Erythritol is not significantly metabolized and so may have a possible use as a non-nutritive sweetener.

Erythritol can be synthetically prepared by treating an aqueous alkali carbonate solution with 2-butene-1,4-diol with chlorine and saponifying the resulting chlorohydrin, hydrogenolysis of dialdehyde starch, reduction of formaldehyde polymers and hydrogenolysis of sorbitol.

A fermentation process for the production of low cost, readily available supplies of erythritol offers the potential of this compound as a heavy organic chemical with a future in polycondensates and other resins as a polyol in competition with glycerol and pentaerythritol.

Strains of yeast of the genus Candida are known to produce various mixtures of the polyhydric alcohols such as glycerol, erythritol, D-arabitol and D-mannitol, usually from carbohydrate substrates. There are also numerous reports in the literature describing the propagation of strains of Candida in media containing hydrocarbons as the principle source of assimilable carbon.

This invention provides a fermentation process for the low cost commercial production of erythritol from certain widely available hydrocarbons. It utilizes a new strain of Candida lipolytica that produces erythritol as the main polyol and in such concentrations that it can be directly crystallized from a concentrate of clarified and deionized fermentation broth.

SUMMARY OF THE INVENTION

The present invention now provides a process for producing erythritol by aerobically fermenting an aqueous nutrient medium containing a hydrocarbon or mixture of hydrocarbons as the principal source of assimilable carbon with a certain new strain of the genus Candida for about 6 to about 9 days, and recovering the erythritol directly by concentrating the filtered and deionized fermentation broth. In particular, this invention comprises a process for producing erythritol by aerobically fermenting Candida lipolytica ATCC No. 20341 in a nutrient medium containing at least one n-alkane hydrocarbon of from 12 to 18 carbon atoms which is intimately mixed with an aqueous phase containing an assimilable source of nitrogen, minerals and other usual nutrients. In the process of this invention, the concentrations of co-produced D-arabitol and D-mannitol are so low and the concentration of erythritol so high as to permit the recovery of pure erythritol by direct crystallization from clarified and deionized fermentation broths.

DETAILED DECRIPTION OF THE INVENTION

It has now been found that a certain strain of the yeast Candida lipolytica has the special ability to produce erythritol in high concentration, during the aerobic fermentation of aqueous media containing a hydrocarbon or mixture of hydrocarbons as the principal or sole source of assimilable carbon, with the co-production of D-arabitol and D-mannitol in low concentrations. At the present time only the one strain of Candida lipolytica is known which permits the easy recovery of erythritol in good yield by direct crystallization from concentrated fermentation broth. The operable strain has been deposited in a recognized public collection, the American Type Culture Collection, and assigned ATCC No. 20341.

Individual n-alkanes, ranging from dodecane to octadecane, can be used as the sole hydrocarbon in the fermentation medium. Mixtures of hydrocarbons can be used as well, including crude and semi-refined materials, but at least a portion should consist of a hydrocarbon having a chain length of from about 12 to 18 carbon atoms. The hydrocarbon level must be at least about 5% by weight of the medium in order to produce significant concentrations and yields of erythritol. Levels up to 20% by weight can be used if desired, but the preferred level is about 15% w./w. for optimum results.

The fermentation medium contains the conventional sources of assimilable nitrogen, minerals and other growth factors which are contained in the aqueous phase. Urea and ammonia are the preferred sources of nitrogen although other materials such as corn steep liquor, soybean meal hydrolysate, amino acids and peptones may be used. It is, of course, well known that certain vitamins and mineral cations and anions are beneficial to the growth of yeasts. A stock trace element and thiamine solution is used which conveniently provides the proper amount and balance of these important substances.

While any form of aerobic incubation is satisfactory, controlled aeration is preferred, as for example, agitation of the medium under air, or sparging of air through the medium. Since the hydrocarbon is imiscible in the aqueous phase, it is desirable to maintain it in a finely dispersed form in the aqueous medium during the fermentation, thus insuring that a large surface of the hydrocarbon will be in contact with the aqueous phase. In this manner there will be optimum contact between the yeast cells, the aqueous phase and the hydrocarbon. A preferred means of accomplishing these objectives is submerged aerobic fermentation, rapidly stirring the mixture while simultaneously passing air through it, e.g., by sparging.

For the fermentation process involving the use of plant ture known in the art for growing yeasts, about 20 to 34° C. for about 4 to 9 days, may be employed. For the fermentation process of this invention, the final production stage in stirred fermenters is conducted for about 6 to 9 days at 24–25° C.

For the fermentation process involving the use of plant scale fermentors, preliminary propagation of cells is usually run in one or more stages. A suitable inoculum medium contains D-glucose, glycerol, and/or n-alkanes as the principal carbon sources plus the conventional sources of assimilable nitrogen, minerals, and other growth factors common to the production medium. The inoculum for any first growth stage is prepared from an aqueous suspension of cells from a slant of *Candida lipolytica* ATCC No. 20341. The amount of inoculum used in the subsequent growth stages is dependent to some extent on the heaviness of cell formation. About a 5% inoculum of good cell growth is generally satisfactory for each stage. Incubation with suitable agitation-aeration is carried out usually at 24–28° C. for about 20 to 72 hours. About a 5% inoculum is also generally satisfactory for inoculation of the final production stage.

The D-mannitol, D-arabitol and erythritol concentrations in the fermentation broth and recovery stages are estimated by a combination of colorimetry and gas liquid chromatography. The total polyol content is assayed by a modification of Bailey's colorimetric procedure described in J. Lab. Clin. Med., 54, 158 (1959). The concentrations of the individual polyols are estimated by a variation of the gas liquid chromatographic method detailed by van Ling in J. Chromatog., 44, 175 (1969).

The erythritol is recovered from the whole fermentation broth by passing the broth through a centrifugal disc separator to remove first the yeast cells and then the residual hydrocarbon from the aqueous phase. The turbid aqueous phase is sparkled by filtration and then deionized by successive passage through weak anion, strong cation and weak anion exchangers. The clarified, deionized broth is then concentrated under reduced pressure and allowed to crystallize under refrigeration. The crystalline erythritol is removed by filtration or centrifugation, and additional crops of crystals obtained by further concentration of mother liquors.

It is to be understood that the process of this invention also embraces the use of mutants or variants of the *Candida lipolytica* strain as produced by various chemical and physical means. Such mutants are produced by X-rays, UV irradiation, treatment with nitrogen mustards or organic peroxides and other similar techniques well known to those skilled in the art. In addition, the use of subcultures, natural mutants, recombinants, variants and the like is contemplated in carrying out the process of the present invention.

The following examples are provided to illustrate the present invention, but not to limit its scope.

CULTURE MAINTENANCE (a) *Canadida lipolytica* ATCC No. 20341 is preserved by lyophilizing cells in a mixture of skimmed milk and bovine blood serum.

(b) Working stocks are maintained by periodic subculture on slants incubated at 28° C. using as a medium 0.5% D-glucose, 0.3% beef extract, 0.5% yeast extract, 3.0% peptone and 2.0% agar.

PREPARATION OF INOCULUM FOR FLASK FERMENTATIONS

A 25 x 150 mm. slant of *Candida lipolytica* ATCC No. 20341 is washed with 20 ml. sterile distilled water. A 0.2 ml. portion of the resulting cell suspension is used to inoculate 10 ml. of medium "A" (per liter: 20.0 g. glycerol, 2.5 g. urea, 1.0 g. $CaSO_4.2H_2O$, 2.5 g. $KH_2PO_4$, 0.25 g. $MgSO_4.7H_2O$, 2.5 mg. $FeSO_4.7H_2O$, 10 mg. $MnSO_4.H_2O$, 500 mcg. thiamine hydrochloride and 0.1 ml. trace element stock solution. The trace element stock solution (1.0 ml.) provides 1.0 mg. $CaCl_2.2H_2O$, and 100 mcg. each of $CuSO_4.5H_2O$, $CoCl_2.6H_2O$, $ZnSO_4.7H_2O$, $(NH_4)_6Mo_7O_{24}.4H_2O$ and $Na_2B_4O_7.10H_2O$. The bulk of the medium is adjusted to pH 4.5 and sterilized by autoclaving (urea is sterilized and added separately).

The inoculated medium "A" contained in 25 x 150 mm. tubes is incubated with agitation for 40 hours at 28° C. The resulting cell growth is referred to as standard inoculum.

PRODUCTION BASAL MEDIUM "B"

This medium is formulated to contain per liter: 2.0 g. urea, 1.0 g. $(NH_4)_2SO_4$, 1.0 g. $CaSO_4.2H_2O$, 0.5 g. $(NH_4)_2HPO_2$, 0.5 g. $K_2SO_4$, 0.25 g. $MgSO_4.7H_2O$, 2.5 mg. $FeSO_4.7H_2O$, 10 mg. $MnSO_4.H_2O$, 500 mcg. thiamine hydrochloride, and 1.0 ml. trace element stock solution. The bulk of the medium is adjusted to pH 3.5 and sterilized by autoclaving (urea is sterilized and added separately).

EXAMPLE I 300 ml. Erlenmeyer flasks containing 20 ml. medium "B" and 4 ml. n-hexadecane (ASTM grade) are each inoculated with 1.0 ml. standard inoculum. The flasks are incubated 9 days at 24–25° C. on a gyrotary shaker (2" stroke, 200 r.p.m.). The aqueous portion of the broth is separated from the residual hydrocarbon and from the yeast cells by centrifugation. The aqueous solution is shown by colorimetry to contain 112 mg./ml. total polyol calculated as erythritol. By gas liquid chromatography, the concentrations of the individual polyols are estimated as 106 mg./ml. erythritol, 0.3 mg./ml. D-arabitol and 8.5 mg./ml. D-mannitol.

EXAMPLE II

The process of Example I is repeated replacing the 4 ml. n-hexadecane with 4 ml. mixed n-alkane (10% $n-C_{14}H_{30}$, 42% $n-C_{15}H_{32}$, 22% $n-C_{16}H_{34}$, 12% $n-C_{17}H_{36}$, and 6% $n-C_{18}H_{38}$ as major constituents). The concentrations of the individual polyols in the aqueous phase after centrifugation of the whole fermentation broth are estimated by gas liquid chromatography as 111 mg./ml. erythritol, 0.2 mg./ml. D-arabitol and 12.9 ml./ml. D-mannitol.

EXAMPLE III

A 25 x 150 mm. agar slant of *Candida lipolytica* ATCC No. 20341 is washed with 20 ml. sterile distilled water. A 3.5 ml. portion of the resulting cell suspension is used to inoculate 350 ml. of medium "A" contained in a Fernbach flask. The inoculated flask is incubated with agitation for 48 hours at 28° C. The Fernbach contents are then used to inoculate a 14 liter New Brunswick fermentor containing 7 liters medium "B," 35 g. $CaCO_3$ and 1400 ml. mixed n-alkanes as described in Example II. The fermentor is maintained at 25° C. by external cooling, sparged with 1 volume sterile air/volume medium/minute, and agitated at 700 r.p.m. After 142 hours, the aqueous phase after centrifugation of the whole fermentation broth contains 89 mg./ml. erythritol, 0.5 mg./ml. D-arabitol and 4.4 mg./ml. D-mannitol, as estimated by gas liquid chromatography.

The whole broth is passed through a centrifugal disc separator to remove yeast cells and residual hydrocarbon. The turbid aqueous phase is sparkled by filtration and then deionized by successive passage through weak anion, strong cation and weak anion exchangers. A portion of the clarified, deionized broth containing 222 g. total polyol is concentrated to 370 ml. under reduced pressure and the erythritol allowed to crystallize under refrigeration. Yield 118 g. Additional crops of crystalline erythritol are obtained by concentrating mother liquors.

EXAMPLE IV

The process of Example III is repeated replacing the mixture of n-paraffins in the final fermenter medium with a mixture of the same weight (comprising equal portions)

of the following hydrocarbons: n-dodecane, n-tridecane, n-pentadecane, n-hexadecane and n-octadecane, with comparable results.

What is claimed is:

1. A process for producing erythritol which comprises fermenting *Candida lipolytica* ATCC No. 20341 in an aqueous nutrient medium containing at least one normal paraffin having from about 12 to 18 carbon atoms as the principle source of assimilable carbon.

2. The process of claim 1 wherein the fermentation is conducted for between 6 and 9 days.

3. The process of claim 1 wherein said erythritol is recovered directly from clarified and deionized fermentation broth.

References Cited

UNITED STATES PATENTS 3,271,266   9/1966   Laine et al. _____ 195—28 R

OTHER REFERENCES

Industrial Microbiology, by Prescott et al., 3rd edition, pp. 242–246 (1959).

ALVIN E. TANENHOLTZ, Primary Examiner

U.S. Cl. X.R.

195—82

PO-1050
(5/69)

UNITED STATES PATENT OFFICE
CERTIFICATE OF CORRECTION

Patent No. 3,756,917    Dated September 4, 1973

Inventor(s) DEZEEUW ET AL

It is certified that error appears in the above-identified patent and that said Letters Patent are hereby corrected as shown below:

Column 1, Line 33 change "with" to --of--.

Column 2, Line 62 change "For the fermentation process involving the use of plant" to --The usual incubation conditions of time and tempera- --.

Column 3, Line 54 change "Canadida" to --Candida--.

Column 3, Line 69 change "2.5" second occurrence to -- 0.5 --.

Column 3, Line 71 change "0.1" to -- 1.0 --.

Column 4, Line 12 change "$(NH_4)_2HPO_2$" to --$(NH_4)_2HPO_4$--.

Signed and sealed this 26th day of February 1974.

(SEAL)
Attest:

EDWARD M. FLETCHER, JR.
Attesting Officer

C. MARSHALL DANN
Commissioner of Patents